J. W. BECK.
Flying Target and Trap.

No. 221,021. Patented Oct. 28, 1879.

WITNESSES:
G. H. Rennett.
A. F. Spees.

INVENTOR.
Joseph W. Beck
Per E. Frink
his attorney

UNITED STATES PATENT OFFICE.

JOSEPH W. BECK, OF INDIANAPOLIS, INDIANA.

IMPROVEMENT IN FLYING TARGETS AND TRAPS.

Specification forming part of Letters Patent No. 221,021, dated October 28, 1879; application filed April 4, 1879.

*To all whom it may concern:*

Be it known that I, JOSEPH W. BECK, of Indianapolis, in the county of Marion and State of Indiana, have invented a new and useful Flying Top and Spring-Trap for Sportsmen, of which the following is a description, reference being had to the accompanying drawings.

The object of my invention is to provide a flying device for sportsmen to shoot at that will, when ejected from the trap, more perfectly imitate the movement of a bird sailing through the air, and readily break when hit by shot.

My invention consists, first, in constructing a flying top with wings of proper spiral planes, all in one solid piece of clay or other brittle material that will break easily when hit with shot; and, second, in the new construction, arrangement, and combination of devices in a spring trap or gun whereby the brittle flying top is ejected and caused to sail through the air with a motion similar to that of a bird in flying, all of which will be hereinafter fully described and set forth.

Figure 1:
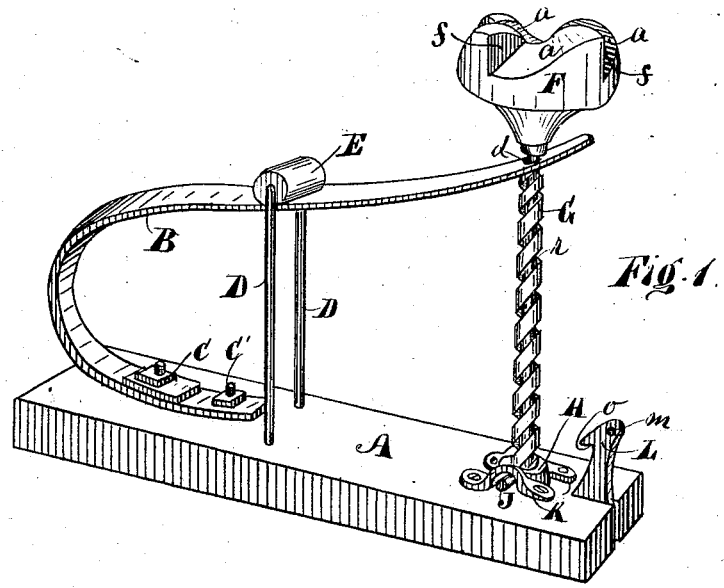
Figure 2:
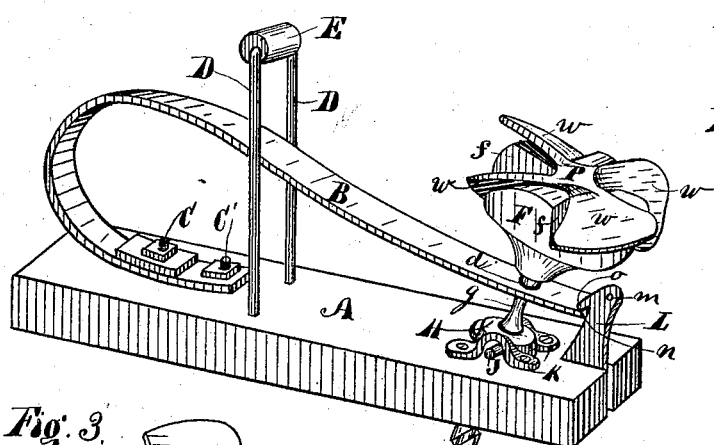
Figures 3, 4:
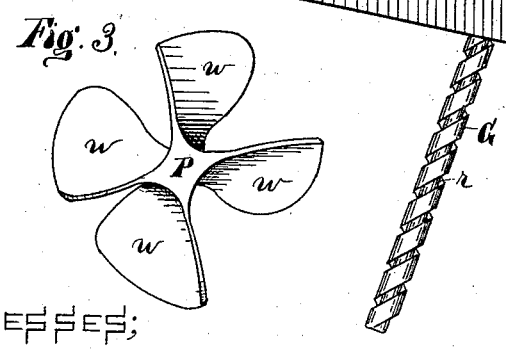

In the accompanying drawings, in which like letters of reference in the different figures indicate like parts, Figure 1 represents a perspective view of the spring-trap as it would appear after ejecting the flying top. Fig. 2 is a perspective view of the spring-trap set, with the flying top in position to be ejected. Fig. 3 represents a plan view of the flying top; and Fig. 4 represents an enlarged perspective view of the adjustable nut, attached to the spring-trap, in which the screw operates.

A represents a bed or base-board. The spring B is curved, as shown in Fig. 1, one end of which is securely bolted to the base A by the bolts C' C, and the other end is provided with a hole, d, for the spindle end g of the screw G to operate in. The spring B is prevented from rising too high, when released, by the stirrup D D, which is secured to the base A, and provided with a leather or rubber cushion, E, at the top, for the spring to strike against. The front end of the spring B is provided with a small notch or catch, n, that hooks under the hook o of the trip L, when the trap is set as shown in Fig. 2. The trip L is inserted and pivoted in a slot formed in the end of the base A, and is provided with a hole, m, for attaching string or wire for operating it when it is desired to release the spring. The adjustable nut H is provided with trunnions J, that operate in suitable bearings K K, attached to the base A.

The nut H may be provided with a screw-thread to operate the screw G, or a pin, p, may be inserted in the nut to operate in the groove r of the screw and cause said screw to rotate when forced down or sprung up in the nut.

The upper end of the screw G is provided with a spindle, g, that passes through the hole d in the spring B, and has the head F secured to it above the spring. The upper face of the head F is provided with spirally-curved receptacles a a a a, one edge, f, of each receptacle being made perpendicular, adapted to receive and hold the flying top and to give it a whirling motion when ejected; as will be hereinafter described.

The flying top P is constructed similar to a propeller-screw, with wings w w w w arranged at any desired pitch. The flying top P is made in one piece, and composed of clay or other brittle substance that will be strong enough to withstand the force exerted upon it by the screw G and head F when said flying top is ejected and given a whirling motion, and yet so brittle as to break easily when hit by shot.

The operation of my improved device is as follows, to wit: The spring B is forced down and hooked under the trip-catch L, and at the same time the screw G is forced through the nut H, revolving the screw and head F, and the spring B, the screw G, and head F are set ready to receive the flying top P, as shown in Fig. 2. When the trip L is pulled back the spring B is released, causing the screw G, the head F, and flying top P to be rapidly elevated and whirled around until the spring B strikes the cushion E, at which point the head stops whirling; but the flying top P rises and soars aloft with a movement similar to that of a bird.

If the flying top P is hit by shot while sailing in the air it is broken, and its movement thereafter resembles that of a wounded bird until it reaches the ground.

What I claim as new, and desire to secure by Letters Patent, is—

1. The flying top P, with wings $w$ $w$, arranged in proper spiral planes, all in one solid piece, made from clay or other brittle material, as and for the purpose specified.

2. In a spring-trap, the screw G, with head F, having spirally-curved notches or recesses $f$ $a$, combined with the nut H, spring B, and trip-catch L, as and for the purpose specified.

In testimony whereof I have signed my name to this specification in the presence of two subscribing witnesses.

JOSEPH W. BECK.

Witnesses:
E. O. FRINK,
G. A. RENNETT.